(12) United States Patent
Demenschonok et al.

(10) Patent No.: US 11,635,820 B1
(45) Date of Patent: Apr. 25, 2023

(54) SYSTEMS AND METHODS FOR HAPTIC EQUALIZATION

(71) Applicant: Meta Platforms Technologies, LLC, Menlo Park, CA (US)

(72) Inventors: Filipp Demenschonok, Bothell, WA (US); Gene R Obie, Coupeville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/941,654

(22) Filed: Sep. 9, 2022

Related U.S. Application Data

(63) Continuation of application No. 17/353,443, filed on Jun. 21, 2021, now Pat. No. 11,474,609.

(60) Provisional application No. 63/056,245, filed on Jul. 24, 2020.

(51) Int. Cl.
*G06F 3/01* (2006.01)
*G06F 3/041* (2006.01)

(52) U.S. Cl.
CPC ............ *G06F 3/016* (2013.01); *G06F 3/0418* (2013.01)

(58) Field of Classification Search
None
See application file for complete search history.

(56) References Cited

U.S. PATENT DOCUMENTS

| | | | | |
|---|---|---|---|---|
| 7,474,983 B2* | 1/2009 | Mazalek | ................. | G06F 3/011 |
| | | | | 702/152 |
| 2014/0042004 A1* | 2/2014 | Tseng | ................... | G06F 3/0362 |
| | | | | 200/336 |
| 2017/0123520 A1* | 5/2017 | Kim | ........................ | G06F 3/016 |
| 2019/0300020 A1* | 10/2019 | Alexiou | ................. | G06F 3/016 |
| 2020/0174262 A1* | 6/2020 | Godar | ..................... | G06F 3/013 |

* cited by examiner

*Primary Examiner* — Stephen T. Reed
(74) *Attorney, Agent, or Firm* — Greenberg Traurig, LLP

(57) ABSTRACT

The disclosed computer-implemented method may include determining, by at least one physical processor of a haptic device, driving signal data. The haptic device comprises a first haptic actuator exhibiting a first frequency response characteristic, and a second haptic actuator exhibiting a second frequency response characteristic different from the first frequency response characteristic. The processor may also generate first and second driving signals by applying first and second pre-processing functions to the driving signal data, respectively. The second pre-processing function is different from the first pre-processing function and the second driving signal is different from the first driving signal. The processor may also drive the first and second haptic actuators by supplying the first and second driving signals to the first and second haptic actuators, respectively. Various other methods, systems, and computer-readable media are also disclosed.

20 Claims, 13 Drawing Sheets

Method
100

```
                    ┌─────────┐
                    │  Start  │
                    └────┬────┘
                         ▼
```

Determining, by at least one physical processor of a haptic device, driving signal data, wherein the haptic device has a first haptic actuator exhibiting a first frequency response characteristic, and a second haptic actuator exhibiting a second frequency response characteristic different from the first frequency response characteristic
110

Generating, by the at least one physical processor, a first driving signal by applying a first pre-processing function to the driving signal data
120

Generating, by the at least one physical processor, a second driving signal by applying a second pre-processing function to the driving signal data, wherein the second pre-processing function is different from the first pre-processing function and the second driving signal is different from the first driving signal
130

Driving, by the at least one physical processor, the first haptic actuator by supplying the first driving signal to the first haptic actuator
140

Driving, by the at least one physical processor, the second haptic actuator by supplying the second driving signal to the second haptic actuator
150

End

*FIG. 1*

SYSTEMS AND METHODS FOR HAPTIC EQUALIZATION

CROSS REFERENCE TO RELATED APPLICATION

This application is a continuation of U.S. patent application Ser. No. 17/353,443, filed Jun. 21, 2021, which claims the benefit of U.S. Provisional Application No. 63/056,245, filed Jul. 24, 2020, the disclosures of each of which are incorporated, in their entirety, by this reference.

BRIEF DESCRIPTION OF DRAWINGS

The accompanying drawings illustrate a number of exemplary embodiments and are a part of the specification. Together with the following description, these drawings demonstrate and explain various principles of the present disclosure.

FIG. 1 is a flow diagram illustrating a computer-implemented method of haptic equalization according to one or more implementations of the present disclosure.

Figure 2:
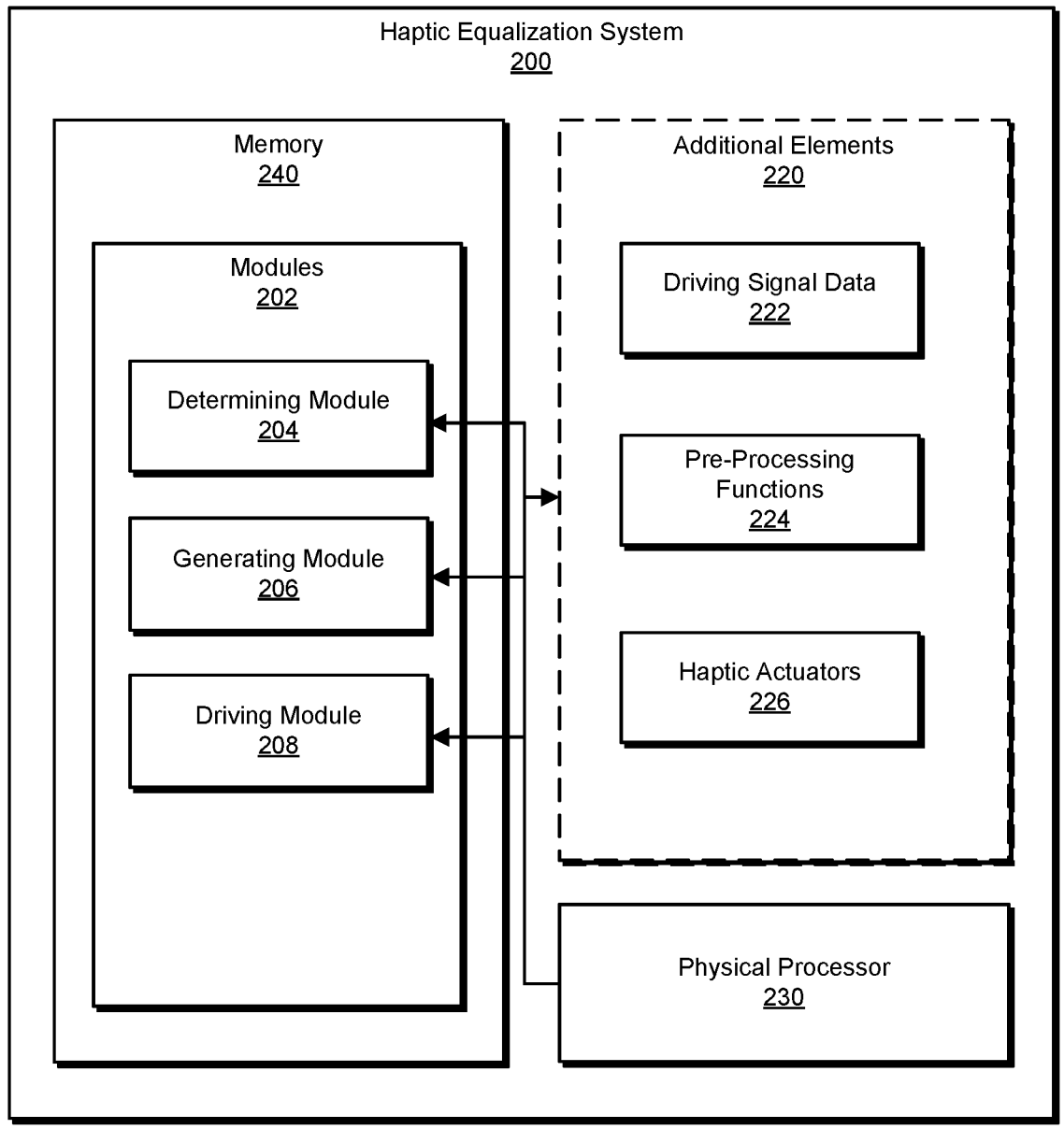
FIG. 2 is a block diagram illustrating a haptic equalization system according to one or more implementations of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION

The proliferation of many different types of haptic actuators and the many different ways they may be implemented presents a problem in reliably reproducing haptic imagery. Another problem arises in the context of a battery mode of operation because driving the haptic actuators at maximum intensity can quickly drain battery power. What is needed is a way to operate haptic actuators more efficiently while predictably and reliably rendering a haptic image using various types of haptic devices. The present disclosure is directed to solutions that address one or more of these needs.

This disclosure generally relates to equalizing haptics responses in various wearable devices and/or controllers. In artificial-reality contexts, a software program (e.g., a game, a productivity environment, etc.) may include instructions to cause a desired haptic output. However, haptic devices (e.g., controllers, wristbands, HMDs, etc.) having different designs may experience different haptic frequency responses when the digital haptic input signal is the same. This occurs due to different resonant frequencies that may be present in the haptic devices of variable design or in different actuator types. Even two units of a single haptic device design may have different haptic frequency responses as a result of manufacturing and assembly tolerances, material variations, or the way the device is held or worn. In contrast, the disclosed systems and methods may equalize the haptic frequency response so that a given haptic input signal results in a haptic frequency response that is substantially consistent across varying haptic device designs. To accomplish this, embodiments of the present disclosure may involve first characterizing a frequency response of various haptic actuators (e.g., LRA, ERM, piezoelectric actuators, voice coil actuators, etc.). An inverse function may be created to allow linearization and/or equalization between the various actuators. In systems with multiple actuators, the function may also be used to allocate portions of an arbitrary driving signal to various drivers to amplify and/or de-amplify various frequency content to produce a linear output, allowing for optimal power usage between the various actuators and producing a desired net frequency response. In addition, the disclosed systems and methods may enable linear responses for non-linear actuators (e.g., LRAs). Various products and form factors may be used to produce a consistent output from a constant input signal, even though those various products may have different resonant frequencies and frequency responses. This allows for haptic input signals to be agnostic to the hardware.

Haptic feedback systems may use a variety of feedback mechanisms. In some traditional systems, haptic feedback may involve creating vibrations with an eccentric rotating mass (ERM) actuator, consisting of an unbalanced weight attached to a motor shaft. As the shaft rotates, the spinning of this irregular mass causes the actuator and the attached device to shake. Some newer devices accomplish their vibrations with a linear resonant actuator (LRA), which moves a mass in a reciprocal manner by means of a magnetic voice coil, similar to how AC electrical signals are translated into motion in the cone of a loudspeaker. LRAs are capable of quicker response times than ERMs, and thus can transmit more accurate haptic imagery. Piezoelectric actuators are also employed to produce vibrations, and offer even more precise motion than LRAs, with less noise and in a smaller platform, but require higher voltages than do ERMs and LRAs.

In some devices, haptic actuators may be driven in correlation with a driving signal based on data that is intended to reproduce a given haptic image. However, haptic actuators typically fail to provide a linear response because they are designed to resonate at certain frequencies. Additionally, different types of haptic actuators have different frequency response characteristics because they resonate in different frequency ranges. Also, haptic actuators of a same type may also have different response characteristics due to different design characteristics (e.g., sizes, shapes, components, etc.), different positioning in or on a haptic device, and/or different mounting solutions. Moreover, haptic devices also exhibit their own frequency response characteristics, and additional differences in frequency response occur due to attachment of the device to a user and physical characteristics of the user.

The present disclosure is generally directed to systems and methods of haptic equalization. In particular, the systems and methods entail application of different pre-processing functions to driving signal data to generate different driving signals that drive different actuators of a haptic device. As will be explained in greater detail below, embodiments of the present disclosure may improve linear response of the actuators of the haptic device and/or drive the actuators more efficiently. Also, embodiments of the present disclosure may enhance these improvements by adapting the pre-processing functions to reduce nonlinearity due to differences in resonant frequency characteristics that result when the haptic device is attached to different users. Additional advantages may be realized in that various products and/or form factors are enabled to produce consistent output from the same input, and high-level functions are able to be agnostic to the hardware but expect consistent response in usage.

The following will provide, with reference to FIGS. 1-8, detailed descriptions of systems and methods for haptic equalization. A computer-implemented method for haptic equalization is described with reference to FIG. 1, and a corresponding haptic equalization system that implements the computer-implemented method is described with reference to FIG. 2. An exemplary haptic device implementing the haptic equalization system is described with reference to FIG. 3, and different types of pre-processing functions are detailed with reference to FIGS. 4 and 5. Computer-implemented methods for generating and updating the pre-processing functions are described respectively with reference to FIGS. 6 and 7, and a corresponding haptic equalization system that implements the updating method is described with reference to FIG. 8.

Because many of the embodiments described herein may be used with substantially any type of virtual or augmented reality system, various components of such systems will be described with reference to FIGS. 9-13. These figures will introduce the various devices and procedures used to provide virtual and/or augmented reality experiences to users.

Haptic equalization may be carried out in any suitable manner, and FIG. 1 is a flow diagram of an exemplary computer-implemented method 100 for haptic equalization. The steps shown in FIG. 1 may be performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

Beginning at step 110, the computer-implemented method of FIG. 1 includes determining, by at least one physical processor 230 of a haptic device, driving signal data. The driving signal data may be determined by any suitable systems and/or modules. For example, determining module 204 in haptic equalization system 200 may determine the driving signal data to perform a frequency sweep (e.g., during a calibration procedure) and/or to render a haptic image. The haptic device has two or more haptic actuators 226, including a first haptic actuator exhibiting a first frequency response characteristic, and a second haptic actuator exhibiting a second frequency response characteristic different from the first frequency response characteristic.

The term haptic device, in some embodiments, generally refers to any mechanical device that mediates communication between the user and the computer. Haptic devices allow users to touch, feel and manipulate three-dimensional objects in virtual environments and tele-operated systems. Most common computer interface devices, such as basic mice and joysticks, are input-only devices, meaning that they track a user's physical manipulations but provide no manual feedback. As a result, information flows in only one direction, from the peripheral to the computer. Haptic devices are input-output devices, meaning that they track a user's physical manipulations (input) and provide realistic touch sensations coordinated with on-screen events (output). Examples of haptic devices include consumer peripheral devices equipped with special motors and sensors (e.g., force feedback joysticks and steering wheels), data gloves, and more sophisticated devices designed for industrial, medical, or scientific applications.

The term frequency sweep, in some embodiments, generally refers to generation of a driving signal for which frequency is varied over time. In some implementations, an amplitude of the driving signal is constant during the frequency sweep. A sinusoidal output may be used while the frequency is varied in a frequency range bounded by a start and stop frequency. Examples of frequency sweeps include, without limitation, stepped sweeps, glide sweeps, time sweeps, and/or table sweeps.

The term calibration procedure, in some embodiments, generally refers to a process involving comparison of measurement values delivered by a device under test with those of a calibration standard of known accuracy. For example, vibrations produced by the haptic device may be measured and compared against vibrations expected to be produced by the haptic device when generating a frequency sweep and/or rendering a haptic image. In this way, pre-processing functions may be initialized and/or updated.

The term haptic image, in some embodiments, generally refers to any datastore of haptic feedback information that can be used to generate various types of haptic feedback based on various criteria, such as user body movements. A haptic image, for example, may cause the generation of driving signals that create a sensation of a rocky surface as a user's data glove moves through a series of positions. Thus, a haptic image may be implemented as a function for producing driving signal data in response to various input criteria.

The term driving signal, in some embodiments, generally refers to any ordered sequence of data or values, or any type of signal, whether in digital or analog form, capable of causing an electromechanical device to produce a vibration.

In one example, a driving signal can be configured as an audio signal. An audio signal is a representation of sound, typically using either a level of electrical voltage for analog signals, or a series of binary numbers for digital signals. A haptic actuator may be driven by a driving signal to produce vibrations that reflect the frequencies and amplitudes of the driving signal.

The term haptic actuator, in some embodiments, generally refers to any type of electronics capable of offering haptic feedback using vibrations. Examples of a haptic actuator include an eccentric rotating mass (ERM) actuator, a linear resonant actuator (LRA), a piezoelectric actuator, and a voice coil actuator. Such actuators may be driven by a driving signal to produce vibrations that render a haptic image.

The term frequency response characteristic, in some embodiments, generally refers to observable amplitude of frequencies produced by a haptic actuator and/or device when driven by a given driving signal. For example, a haptic actuator of a haptic device may be driven by a given driving signal, and a frequency response characteristic of the actuator and/or device may be observed by a non-linearity of the vibrations that are produced. Accordingly, one range of frequencies may resonate more strongly than another, leading to an output vibration that is different than the input driving signal. The observable linear and non-linear response ranges, and the per frequency amplitudes of the vibrations, may characterize the frequency response of an actuator and/or device.

Processing of method 100 may proceed from step 110 to step 120, at which the method 100 includes generating, by at least one physical processor 230 of a haptic device, a first driving signal by applying a first pre-processing function to the driving signal data. The first driving signal may be generated by any suitable systems and/or modules. For example, generating module 206 in haptic equalization system 200 may generate the first driving signal by applying a pre-processing function that is configured to reverse non-linear response of the first actuator by attenuating amplitude at certain frequencies and/or amplifying the amplitude at other frequencies. Alternatively or additionally, generating module 206 may apply a pre-processing function that operates as a cut function by attenuating the driving signal in one or more frequency ranges at which the first actuator is less efficient than in one or more other frequency ranges.

The term pre-processing function, in some embodiments, generally refers to a mathematical operation that is performed on driving signal data before a driving signal is generated. For example, one or more amplitudes of driving signal data at one or more frequencies may be reduced, and one or more other amplitudes of the driving signal data at one or more other frequencies may be increased. Generating module 206 may thus generate a driving signal based on the modified driving signal data.

Processing of method 100 may proceed from step 120 to step 130, although it should be understood that steps 120 and 130 may alternatively be performed in parallel or in a different order. At step 130, method 100 includes generating, by the at least one physical processor 230 of the haptic device, a second driving signal by applying a second pre-processing function to the driving signal data. The second driving signal may be generated by any suitable systems and/or modules. For example, generating module 206 in haptic equalization system 200 may generate the second driving signal by applying a pre-processing function that is configured to reverse non-linear response of the second actuator by attenuating amplitude at certain frequencies and/or amplifying the amplitude at other frequencies. Alternatively or additionally, generating module 206 may apply a pre-processing function that operates as a cut function by attenuating the driving signal in one or more frequency ranges at which the first actuator is less efficient than in one or more other frequency ranges. The second pre-processing function is different from the first pre-processing function and the second driving signal is different from the first driving signal. This difference may be in terms of the amount of increase or decrease in certain frequency ranges.

Processing of method 100 may proceed from step 130 to step 140, although processing may additionally or alternatively proceed to step 140 from step 120. At step 140, method 100 includes driving, by the at least one physical processor 230, the first haptic actuator by supplying the first driving signal to the first haptic actuator. The first haptic actuator may be driven by any suitable systems and/or modules. For example, driving module 208 in haptic equalization system 200 may drive the first haptic actuator.

Processing of method 100 may proceed from step 140 to step 150, although processing may additionally or alternatively proceed to step 150 from step 120 and/or step 130. At step 150, method 100 includes driving, by the at least one physical processor 230, the second haptic actuator by supplying the second driving signal to the second haptic actuator. The second haptic actuator may be driven by any suitable systems and/or modules. For example, driving module 208 in haptic equalization system 200 may drive the second haptic actuator.

In some implementations of the method 100, the haptic device may have a third haptic actuator among actuators 226 exhibiting a third frequency response characteristic different from the first frequency response characteristic and the second frequency response characteristic. In such implementations, the method 100 additionally includes generating, by the at least one physical processor 230, a third driving signal by applying a third pre-processing function of functions 224 to the driving signal data. The third pre-processing function is different from the first pre-processing function and the second pre-processing function, and the third driving signal is different from the first driving signal and the second driving signal. In these implementations, method 100 additionally includes driving, by the at least one physical processor 230, the third haptic actuator by supplying the third driving signal to the third haptic actuator. For example, the haptic device may have different types of haptic actuators 226, such as an eccentric rotating mass actuator, a linear resonant actuator, and/or a piezoelectric actuator. Alternatively, the haptic device may have haptic actuators 226 that include two or more actuators of a same type that have different frequency response characteristics.

In some implementations of the method 100, the first pre-processing function is a first inverse function that reverses nonlinearity of the first frequency response characteristic, and the second pre-processing function is a second inverse function that reverses non-linearity of the second frequency response characteristic. Additionally or alternatively, in some implementations of the method 100, the first pre-processing function corresponds to a first cut function that segments the driving signal data according to a first frequency allocation for a first frequency range in which the first haptic actuator operates more efficiently than the second haptic actuator, and the second pre-processing function corresponds to a second cut function that segments the driving signal data according to a second frequency allocation for a second frequency range in which the second haptic actuator operates more efficiently than the first haptic actuator.

A haptic equalization system may be implemented in any suitable manner. Turning to FIG. 2, an exemplary haptic equalization system 200 includes at least one physical processor 230, physical memory 240 comprising computer-executable instructions such as modules 202, and additional elements 220, such as driving signal data 222, pre-processing functions 224, and haptic actuators 226. When executed by the physical processor, the modules 202 cause physical processor 230 to carry out various operations. For example, determining module 204 may execute procedures described above with reference to steps 110 of method 100 of FIG. 1. Additionally, generating module 206 may execute procedures described above with reference to steps 120 and 130 of method 100 of FIG. 1. Also, driving module 208 may execute procedures described above with reference to steps 140 and 150 of method 100 of FIG. 1.

Figure 3:
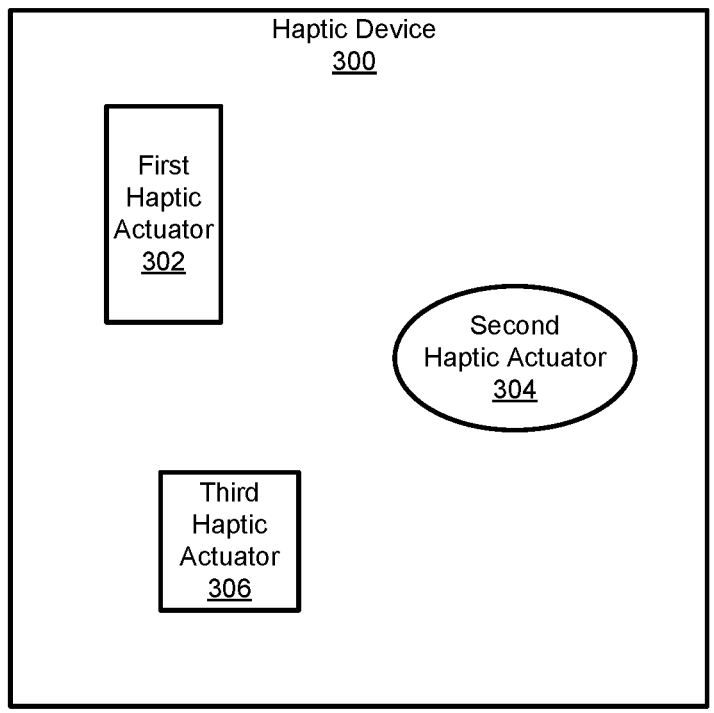
FIG. 3 is a flow diagram illustrating a haptic device according to one or more implementations of the present disclosure.

A haptic device may be implemented in any suitable manner. Turning to FIG. 3, haptic device 300 may be a data glove, a smartwatch, a joystick, or any other equipment capable of providing haptic feedback. Haptic device 300 has a plurality of haptic actuators, at least some of which have different frequency resonance characteristics. For purposes of illustration, three haptic actuators are shown, including a first haptic actuator 302, a second haptic actuator 304, and a third haptic actuator 306. Haptic actuators 302-306 may be of a same or different type and/or a same or different design. However, even if haptic actuators 302-306 are identical in all other respects, differences of location and manner of attachment of haptic devices results in difference of frequency responses. Moreover, it is envisioned that haptic actuators 302-306 may be intentionally chosen for having different frequency response characteristics in different frequency ranges to ensure that intense and/or efficient frequency response can be achieved across an entire frequency range. Stated differently, each of haptic actuators 302-306 may exhibit a different range of resonant frequencies. It is envisioned that the haptic actuators 302-304 may be placed in or on a particular electronic device (e.g., smart watch) and/or in or on an accessory (e.g., watch band) for attachment of the electronic device to a user.

Figure 4:
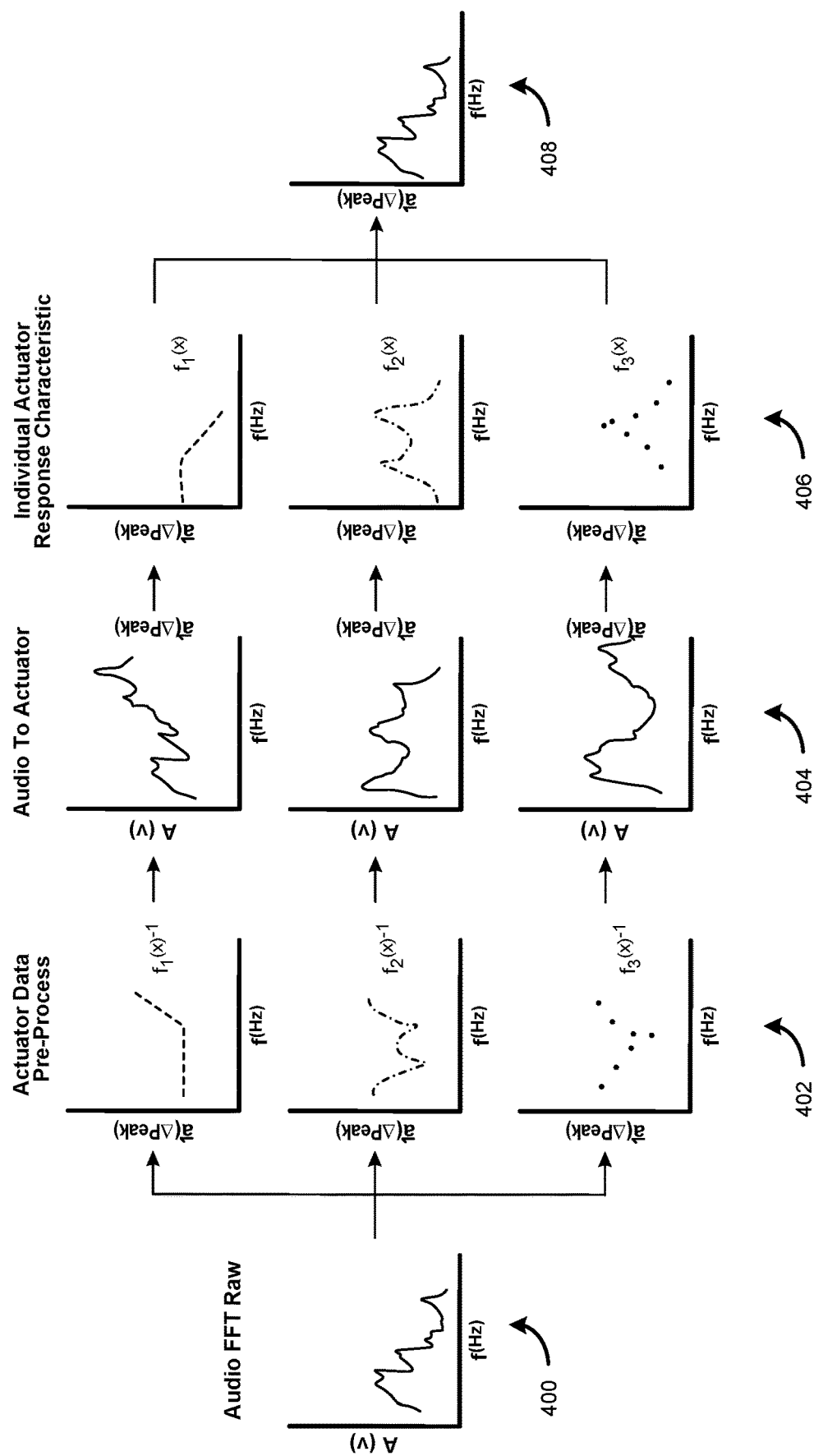
FIG. 4 is a graphical illustration depicting application of pre-processing functions configured to produce a maximum linear response according to one or more implementations of the present disclosure.

Various sets of pre-processing functions may be implemented in any suitable manner. Referring to FIG. 4, driving signal data 400 is determined to render a particular haptic response. In this example, the driving signal data corresponds to an audio Fast Fourier Transform (FFT). A FFT converts a signal into individual spectral components and thereby provides frequency information about the signal. Such a signal be generated in response to user interactions with a virtual object based on a haptic image configured as data corresponding to various signals to be generated in response to user interactions with the object. Alternatively, the haptic image may be configured as data corresponding to various audio FFTs to be generated in response to user interactions with a virtual object. Pre-processing functions 402 in this example are configured as inverse functions that reverse nonlinearities 406 of their respective haptic actuators. Thus, driving signals 404, which are configured as audio signals in this example, that are generated by application of these different functions 402 are adapted in such a way that the nonlinearities 406 of the haptic actuators result in an output frequency response 408 that matches the driving signal data. In this example, each of the actuators is driven to produce the output frequency response that matches the driving signal data, and the combined outputs result in an intense response. Haptic equalization system 200 may selectively utilize this set of pre-processing functions during a powered mode of operation and/or based on a user preference.

Figure 5:
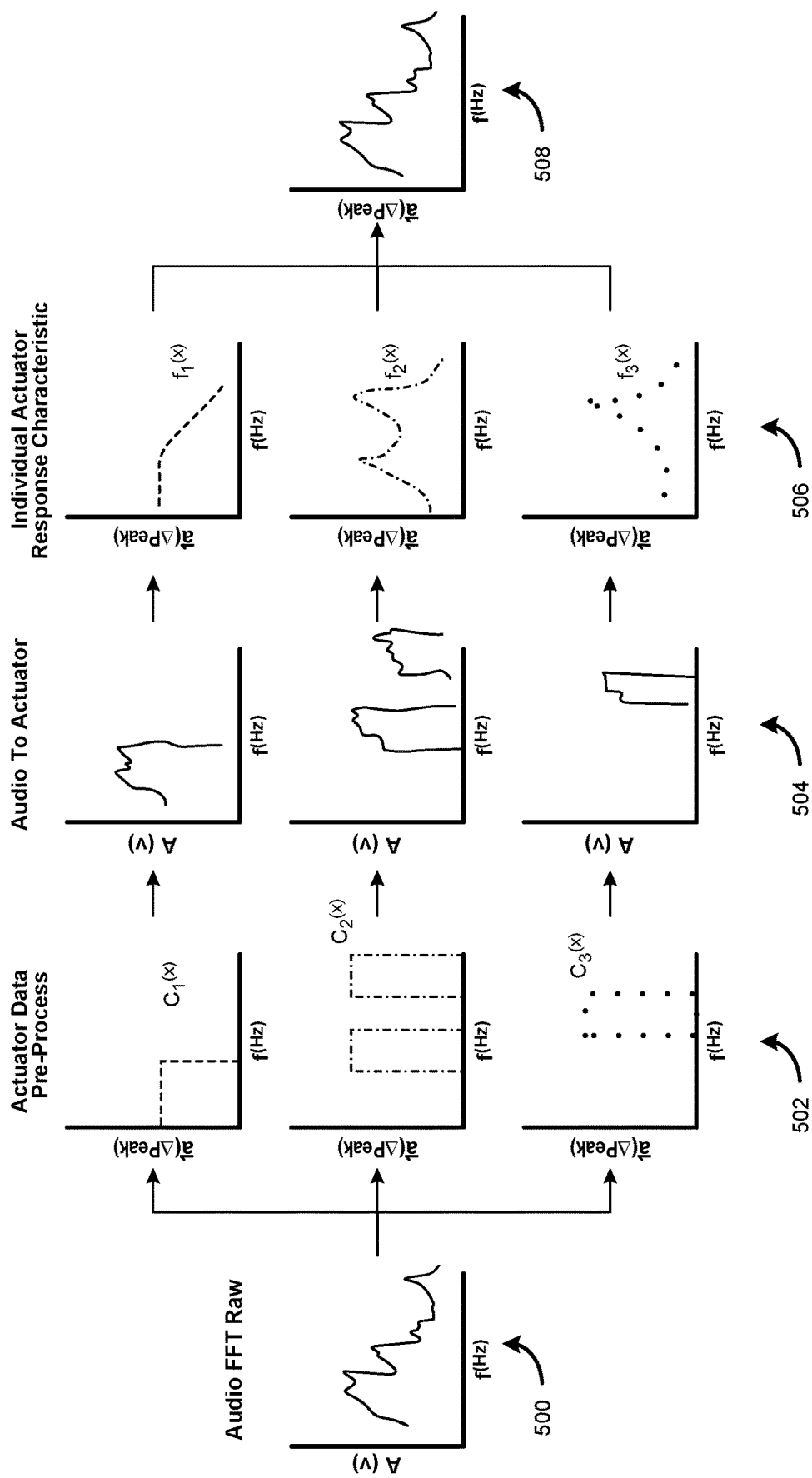
FIG. 5 is a graphical illustration depicting application of pre-processing functions configured to produce a most efficient response according to one or more implementations of the present disclosure.

Haptic equalization system 200 may selectively use a different set of pre-processing functions during a battery mode of operation and/or based on user preference. Referring to FIG. 5, driving signal data 500 is determined to render a particular haptic response. In this example, the driving signal data 500 is configured as an audio FFT. Pre-processing functions 502 in this example are configured as cut functions that segment driving signal data 500 according to frequency allocations for frequency ranges in which their respective actuators operate more efficiently than other ones of the haptic actuators. Stated differently, the cut function applied for a particular haptic actuator may entirely attenuate driving signal data 500 in one or more frequency ranges in which that haptic actuator fails to resonate. The set of cut functions may be configured in such a way that an entire frequency spectrum is allocated among the haptic actuators. Accordingly, edges of the cut functions may match up to ensure that no two actuators are driven at a same frequency, and exactly one actuator is driven at each frequency. It should be understood that the cut functions may additionally reverse non-linearity of their respective actuators within the frequency ranges at which the actuators are driven. Alternatively, the cut functions may be applied in combination (e.g., in series) with the pre-processing functions 402 of FIG. 4. Thus, driving signals 504, which are configured as audio signals in this example, that are generated by application of these different functions 502 are adapted in such a way that the nonlinearities 406 of the haptic actuators result in a combined output frequency response 508 that matches the driving signal data. In this example, each of the actuators is driven to produce the output frequency response that matches the driving signal data, but only in their respective resonant frequency ranges. The combined outputs result in an efficient response that conserves battery power.

Figure 6:
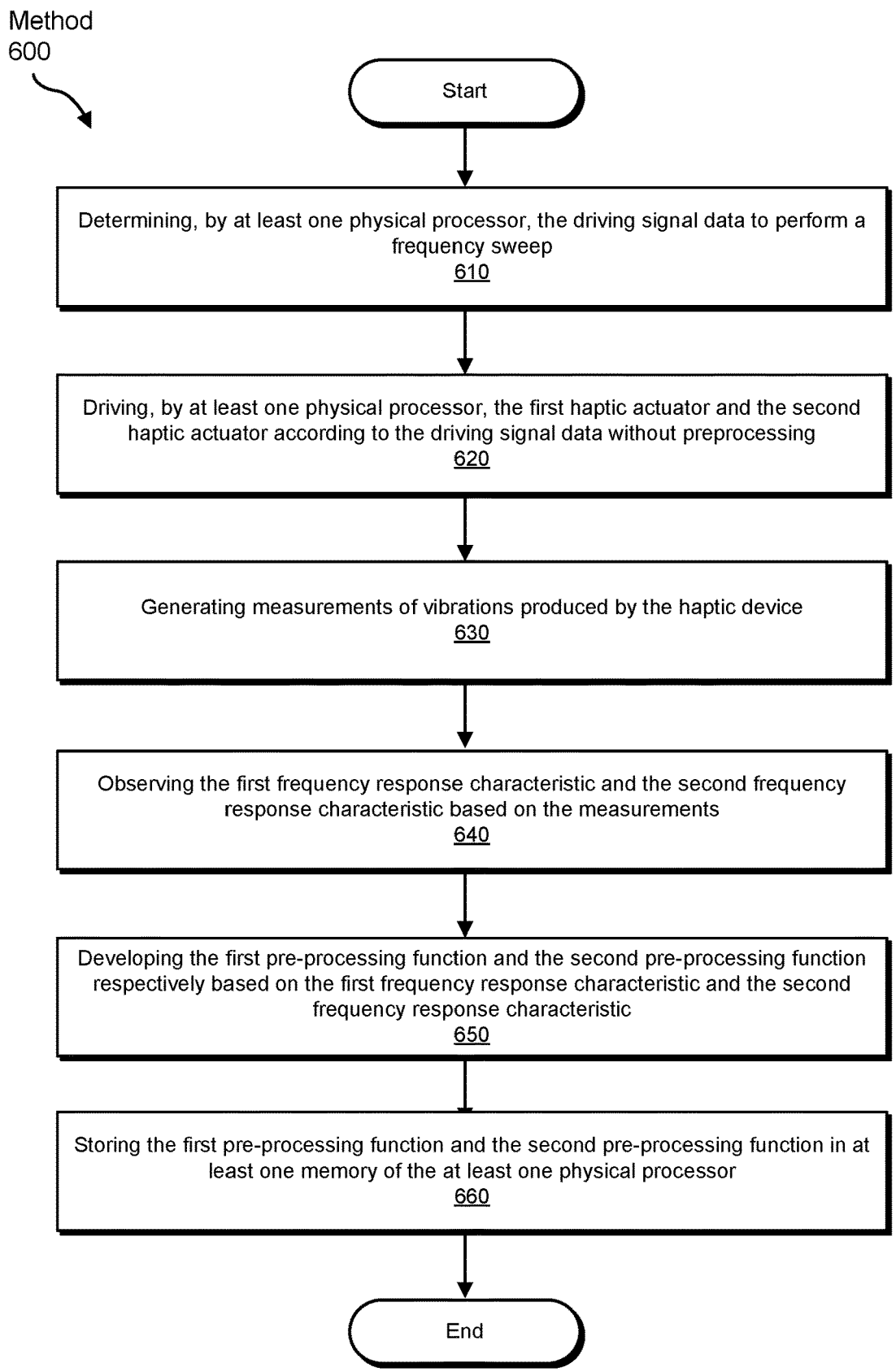
FIG. 6 is a flow diagram illustrating a computer-implemented method of generating pre-processing functions according to one or more implementations of the present disclosure.
Figure 7:
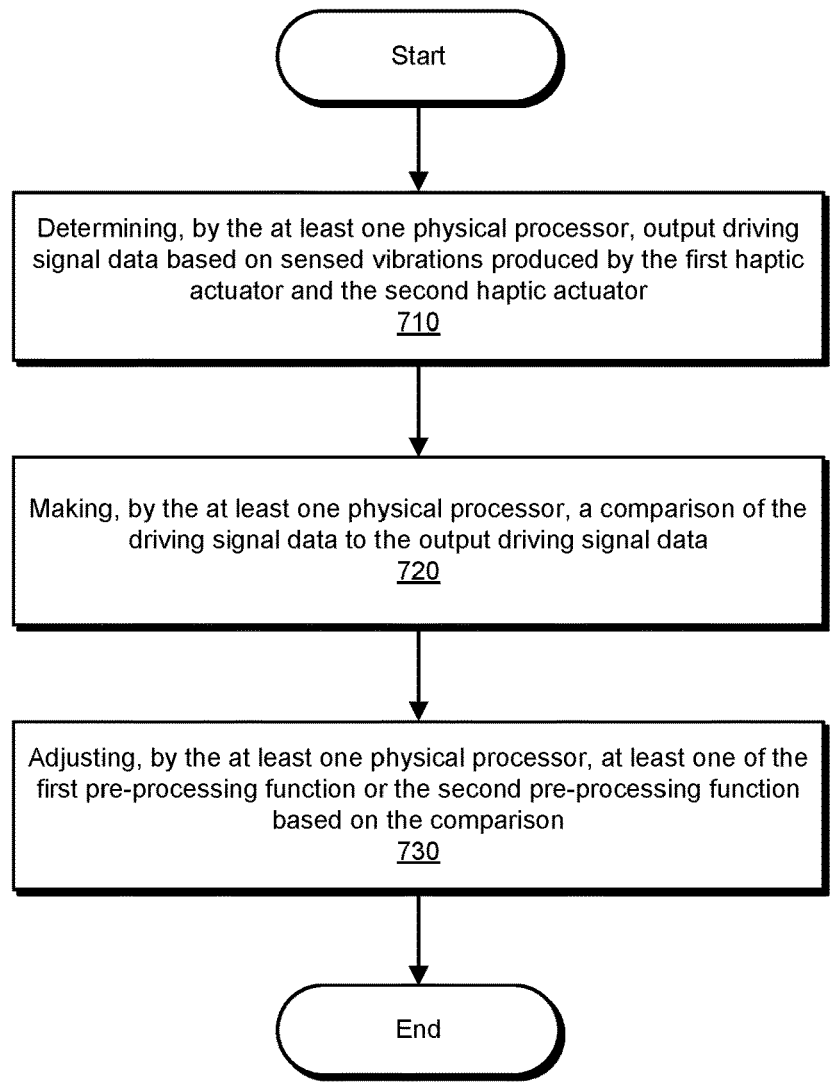
FIG. 7 is a flow diagram illustrating a computer-implemented method of updating pre-processing functions according to one or more implementations of the present disclosure.

One or more sets of pre-processing functions may be generated and updated in any suitable manner. FIG. 6 is a flow diagram of an exemplary computer-implemented method 600 for generation of pre-processing functions, and FIG. 7 is a flow diagram of an exemplary computer-implemented method 700 for updating the pre-processing functions. The steps shown in FIGS. 6 and 7 may be performed by any suitable computer-executable code and/or computing system, including the system illustrated in FIG. 8. In one example, each of the steps shown in FIGS. 6 and 7 may represent an algorithm whose structure includes and/or is represented by multiple sub-steps, examples of which will be provided in greater detail below.

Beginning at step 610, the computer-implemented method of FIG. 6 includes determining, by at least one physical processor 830 of a haptic device, driving signal data to perform a frequency sweep. The driving signal data may be determined by any suitable systems and/or modules. For example, determining module 804 in haptic equalization system 800 may determine the driving signal data 822. Processing may proceed from step 610 to step 620.

In step 620, the computer-implemented method of FIG. 6 includes driving, by at least one physical processor 830 of a haptic device, haptic actuators 826, including the first haptic actuator and the second haptic actuator, according to the driving signal data 822 without preprocessing. For example, generating module 806 may generate the driving signal and driving module 808 may drive the haptic actuators 826.

Driving module 808 may drive each individual haptic actuator with the frequency sweep one at a time. Alternatively or additionally, driving module 808 may drive all of the haptic actuators 826 simultaneously. Processing may proceed from step 620 to step 630.

In step 630, the computer-implemented method of FIG. 6 includes generating, by at least one physical processor 830 of a haptic device, measurements of vibrations produced by the haptic device. For example, one or more sensors 828, such as one or more displacement sensors, may generate the measurements. Example sensors 828 include an inertial measurement unit (IMU), a piezoelectric or piezoresistive sensor, a pressure sensor, a strain gauge, and/or an optical sensor, such as a laser vibrometer. Processing may proceed from step 630 to step 640.

The term sensor, in some embodiments, generally refers to a device which detects or measures a physical property and records, indicates, or otherwise responds to it. A sensor may be implemented as a device, module, machine, or subsystem whose purpose is to detect events or changes in its environment and send the information to other electronics, frequently a computer processor.

The term displacement sensor, in some embodiments, generally refers to a sensor that may be used to measure travel range between where an object is and a reference position. Displacement sensors can be used for dimension measurement to determine an object's height, thickness, and width in addition to travel range. Measurements with displacement sensors can be classified into two large categories: non-contact measurement using light, magnetic fields, and/or sound waves, or contact measurement performed in direct contact with the target. Depending on what element is used, there are several types of displacement sensors. Example types of displacement sensors include, without limitation, optical displacement sensors, linear proximity sensors, and ultrasonic displacement sensors.

The term inertial measurement unit (IMU), in some embodiments, generally refers to a self-contained system that measures linear and angular motion, usually with a triad of gyroscopes and triad of accelerometers. An IMU can either be gimballed or strapdown, outputting the integrating quantities of angular velocity and acceleration in the sensor/body frame. IMUS are commonly referred to as rate-integrating gyroscopes and accelerometers.

The term piezoelectric sensor, in some embodiments, generally refers to a device that uses the piezoelectric effect to measure changes in pressure, acceleration, temperature, strain, or force by converting them to an electrical charge. The term piezoresistive sensor, in some embodiments, generally refers to a device that uses the piezoresistive effect to measure changes in a mechanical input (e.g., pressure, force, acceleration) by converting it to an electrical resistance. For accelerometers, a seismic mass may be attached to the crystal elements.

The term laser vibrometer, in some embodiments, generally refers to a scientific instrument that is used to make non-contact vibration measurements of a surface. The laser beam from the vibrometer is directed at the surface of interest, and the vibration amplitude and frequency are extracted from the Doppler shift of the reflected laser beam frequency due to the motion of the surface. The output of a vibrometer is generally a continuous analog voltage that is directly proportional to the target velocity component along the direction of the laser beam.

The term pressure sensor, in some embodiments, generally refers to an instrument having a pressure sensitive element to determine the actual pressure applied to the sensor (using different working principles) and some components to convert this information into an output signal. Examples of pressure sensors include, without limitation, potentiometric pressure sensors, inductive pressure sensors, capacitive pressure sensors, piezoelectric pressure sensors, strain gauge pressure sensors, and variable reluctance pressure sensors.

The term strain gauge, in some embodiments, generally refers to a device for indicating the strain of a material or structure at the point of attachment. Example types of strain gauges include, without limitation, linear strain gauges, membrane rosette strain gauges, double linear strain gauges, full bridge strain gauges, shear strain gauges, half bridge strain gauges, column strain gauges, 45°-Rosette (3 measuring directions), and 90°-Rosette (2 measuring directions).

In step 640, the computer-implemented method of FIG. 6 includes observing, by at least one physical processor 830 of a haptic device, the first frequency response characteristic and the second frequency response characteristic based on the measurements. Processing may proceed from step 640 to step 650.

In step 650, the computer-implemented method of FIG. 6 includes developing, by at least one physical processor 830 of a haptic device, the first pre-processing function and the second pre-processing function respectively based on the first frequency response characteristic and the second frequency response characteristic. For example, physical processor 830 may develop inverse functions that reverse non-linearity of the observed frequency responses. Alternatively or additionally, physical processor 830 may develop cut functions with edges that segment the driving signal based on frequency ranges at which the haptic actuators are observed to operate most efficiently. Processing may proceed from step 650 to step 660.

In step 660, the computer-implemented method of FIG. 6 includes storing, by at least one physical processor 830 of a haptic device, the first pre-processing function and the second pre-processing function in at least one memory of the at least one physical processor. For example, physical processor 830 may store pre-processing functions 824 in memory 840.

It should be understood that method 600 of FIG. 6 may be performed before method 100 of FIG. 1. It should also be understood that certain steps of method 600 may be performed by an entity other than processor 830. For example, method 600 may be performed at a factory by a different processor than the processor of the haptic device, and at least some of the steps may be performed by humans without the aid of a physical processor. Moreover, method 600 may be used to develop the functions for one haptic device, and copies of those functions may be stored in memories of other devices that are similar or identical to that haptic device.

As previously noted, update of pre-processing functions 824 may be performed in any suitable manner, and FIG. 7 is a flow diagram of an exemplary computer-implemented method 700 for updating the pre-processing functions. The procedures enacted in FIG. 7 may be performed during user profile development the first time a user attaches the haptic device, in which case driving signal data 822 may be determined to perform a frequency sweep. Alternatively or additionally, the procedures enacted in FIG. 7 may be performed during normal operation of the haptic device, in which case the driving signal data may be determined to render a haptic image.

Beginning at step 710, the computer-implemented method 700 of FIG. 7 includes determining, by at least one physical processor 830 of a haptic device, output driving signal data based on sensed vibrations produced by the first haptic actuator and the second haptic actuator. The output driving signal data may be determined by any suitable systems and/or modules. For example, updating module 810 may receive the output driving signal data from sensors 828 (e.g., an IMU) in haptic equalization system 800. Step 710 may occur after or in parallel with the driving of the haptic actuators, based on driving signal data 822, in steps 140 and 150 of FIG. 1. Processing may proceed from step 710 to step 720.

In step 720, the computer-implemented method 700 of FIG. 7 includes making, by the at least one physical processor 830, a comparison of the driving signal data 822 to the output driving signal data. The comparison may be performed by any suitable systems and/or modules. For example, updating module 810 may compare the output driving signal data to the driving signal data 822 that was used to drive the haptic actuators 826 in producing the measurements. Processing may proceed from step 720 to step 730.

In step 730, the computer-implemented method 700 of FIG. 7 includes adjusting, by the at least one physical processor 830, at least one of the first pre-processing function or the second pre-processing function based on the comparison. The adjusting may be performed by any suitable systems and/or modules. For example, updating module 810 may adjust amplitudes of frequencies of one or more inverse functions to more effectively reverse non-linearity of one or more of haptic actuators 826. Alternatively or additionally, updating module 810 may adjust edges of cut functions to more efficiently allocate driving signal power to haptic actuators 826. Adjusting module 810 may make these adjustments directly to pre-processing functions 824. Alternatively, adjusting module 810 may store a new set of updated functions 829 for use with a particular user. Accordingly, if there are multiple users enrolled, updating module 810 may store multiple sets of updated functions 829 in memory 840.

Figure 8:
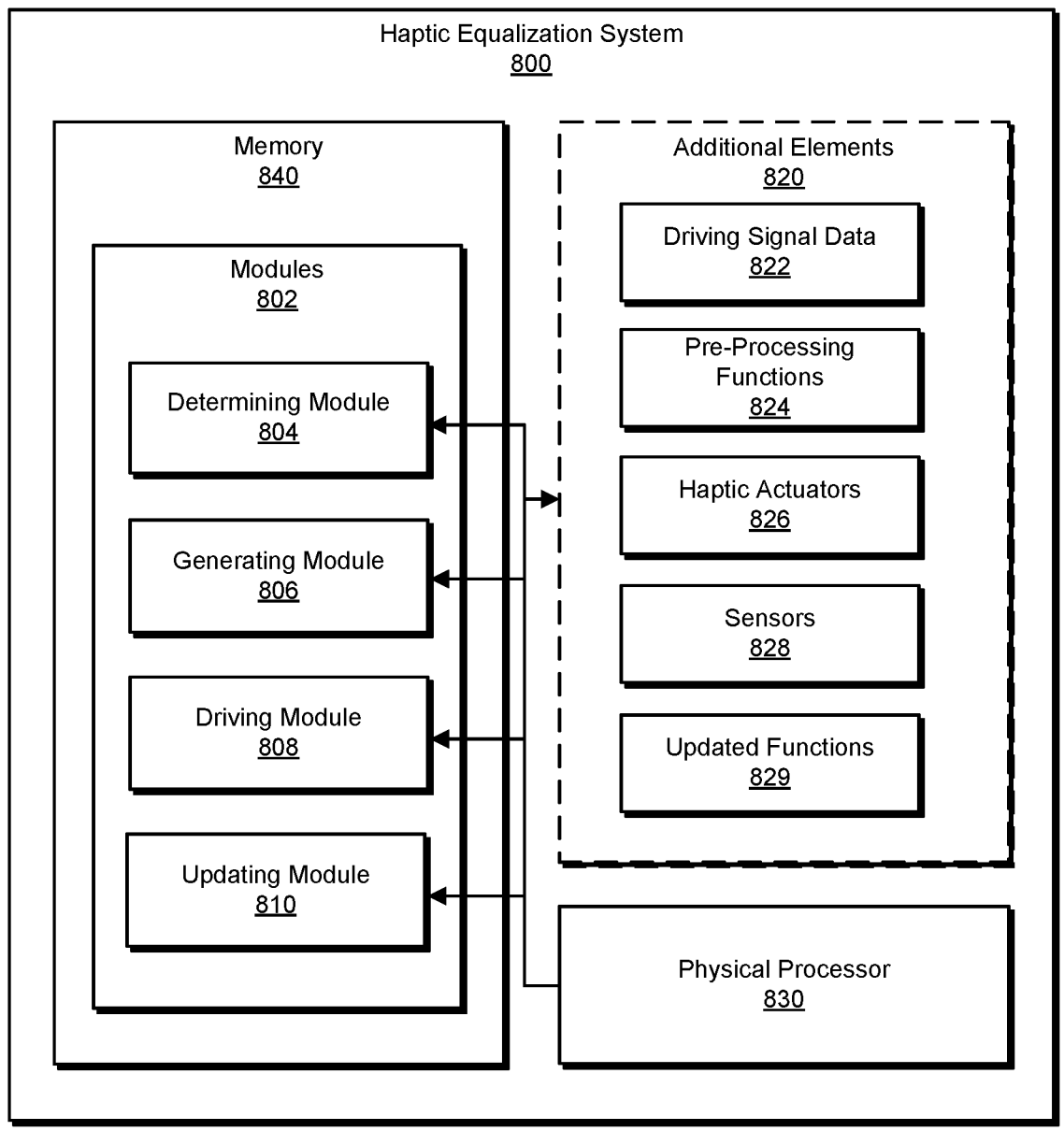
FIG. 8 is a block diagram illustrating a haptic equalization system according to one or more implementations of the present disclosure.

A haptic equalization system having update functionality may be implemented in any suitable manner. Turning to FIG. 8, an exemplary haptic equalization system 800 includes at least one physical processor 830, physical memory 840 comprising computer-executable instructions such as modules 802, and additional elements 820, such as driving signal data 822, pre-processing functions 824, haptic actuators 826, sensors 828, and updated functions 829. When executed by the physical processor, the modules 802 cause physical processor 830 to carry out various operations. For example, determining module 804 may execute procedures described above with reference to determining module 204 of FIG. 2 and step 110 of method 100 of FIG. 1. Additionally, generating module 806 may execute procedures described above with reference to generating module 206 of FIG. 2 and steps 120 and 130 of method 100 of FIG. 1. Also, driving module 808 may execute procedures described above with reference to driving module 208 of FIG. 2 and steps 140 and 150 of method 100 of FIG. 1. Further, updating module 810 may execute procedures described above with reference to steps 710-730 of method 700 of FIG. 7.

From the foregoing description, the skilled person should readily appreciate that embodiments of the present disclosure may improve linear response of the actuators of the haptic device and/or drive the actuators more efficiently. Also, embodiments of the present disclosure may enhance these improvements by adapting the pre-processing functions to reduce nonlinearity due to differences in resonant frequency characteristics that result when the haptic device is attached to different users. Additional advantages may be realized in that various products/formfactors are enabled to produce consistent output from the same input and high-level functions are able to be agnostic to the hardware but expect consistent response in usage.

Example Embodiments

Example 1: A computer-implemented method may include: determining, by at least one physical processor of a haptic device, driving signal data, wherein the haptic device comprises a first haptic actuator exhibiting a first frequency response characteristic, and a second haptic actuator exhibiting a second frequency response characteristic different from the first frequency response characteristic; generating, by the at least one physical processor, a first driving signal by applying a first pre-processing function to the driving signal data; generating, by the at least one physical processor, a second driving signal by applying a second pre-processing function to the driving signal data, wherein the second pre-processing function is different from the first pre-processing function and the second driving signal is different from the first driving signal; driving, by the at least one physical processor, the first haptic actuator by supplying the first driving signal to the first haptic actuator; and driving, by the at least one physical processor, the second haptic actuator by supplying the second driving signal to the second haptic actuator.

Example 2: The computer-implemented method of Example 1, wherein the haptic device comprises a third haptic actuator exhibiting a third frequency response characteristic different from the first frequency response characteristic and the second frequency response characteristic, the method further comprising: generating, by the at least one physical processor, a third driving signal by applying a third pre-processing function to the driving signal data, wherein the third pre-processing function is different from the first pre-processing function and the second pre-processing function, and the third driving signal is different from the first driving signal and the second driving signal; and driving, by the at least one physical processor, the third haptic actuator by supplying the third driving signal to the third haptic actuator.

Example 3: The computer-implemented method of any of Examples 1 and 2, wherein the first pre-processing function is a first inverse function that reverses nonlinearity of the first frequency response characteristic and the second pre-processing function is a second inverse function that reverses non-linearity of the second frequency response characteristic.

Example 4: The computer-implemented method of any of Examples 1-3, wherein the first pre-processing function corresponds to a first cut function that segments the driving signal data according to a first frequency allocation for a first frequency range in which the first haptic actuator operates more efficiently than the second haptic actuator, and the second pre-processing function corresponds to a second cut function that segments the driving signal data according to a second frequency allocation for a second frequency range in which the second haptic actuator operates more efficiently than the first haptic actuator.

Example 5. The computer-implemented method of any of Examples 1-4, wherein the haptic device comprises at least one sensor that detects vibrations generated by the first haptic actuator and the second haptic actuator, the method further comprising: determining, by the at least one physical processor during a calibration procedure, output driving signal data based on sensed vibrations produced by the first haptic actuator and the second haptic actuator; comparing, by the at least one physical processor during the calibration procedure, the driving signal data to the output driving signal data; and adjusting, by the at least one physical processor during the calibration procedure, at least one of the first pre-processing function or the second pre-processing function based on the comparison.

Example 6. The computer-implemented method of any of Examples 1-5, further comprising determining, by at least one physical processor during the calibration procedure, the driving signal data to perform a frequency sweep.

Example 7. The computer-implemented method of any of Examples 1-6, wherein the at least one sensor comprises at least one of: an inertial measurement unit (IMU); a piezoelectric or piezoresistive sensor; an optical sensor; a pressure sensor; or a strain gauge.

Example 8. The computer-implemented method of any of Examples 1-7, further comprising: determining, by at least one physical processor during a calibration procedure, the driving signal data to perform a frequency sweep; driving, by at least one physical processor during the calibration procedure, the first haptic actuator and the second haptic actuator according to the driving signal data without pre-processing; generating measurements of vibrations produced by the haptic device; observing the first frequency response characteristic and the second frequency response characteristic based on the measurements; developing the first pre-processing function and the second pre-processing function respectively based on the first frequency response characteristic and the second frequency response characteristic; and storing the first pre-processing function and the second pre-processing function in at least one memory of the at least one physical processor.

Example 9. The computer-implemented method of any of Examples 1-8, wherein the generating measurements of vibrations produced by the haptic device is performed using a laser vibrometer.

Example 10. A system may include: at least one physical processor of a haptic device; and at least one memory coupled to the at least one physical processor, wherein the at least one physical processor is configured to: determine driving signal data, wherein the haptic device comprises a first haptic actuator exhibiting a first frequency response characteristic, and a second haptic actuator exhibiting a second frequency response characteristic different from the first frequency response characteristic; generate a first driving signal by applying a first pre-processing function to the driving signal data; generate a second driving signal by applying a second pre-processing function to the driving signal data, wherein the second pre-processing function is different from the first pre-processing function and the second driving signal is different from the first driving signal; drive the first haptic actuator by supplying the first driving signal to the first haptic actuator; and drive the second haptic actuator by supplying the second driving signal to the second haptic actuator.

Example 11. The system of Example 10, wherein the haptic device comprises a third haptic actuator exhibiting a third frequency response characteristic different from the first frequency response characteristic and the second frequency response characteristic, the at least one physical processor being further configured to: generate a third driving signal by applying a third pre-processing function to the driving signal data, wherein the third pre-processing function is different from the first pre-processing function and the second pre-processing function, and the third driving signal is different from the first driving signal and the second driving signal; and drive the third haptic actuator by supplying the third driving signal to the third haptic actuator.

Example 12. The system of any of Examples 10 and 11, wherein the first pre-processing function is a first inverse function that reverses nonlinearity of the first frequency response characteristic and the second pre-processing function is a second inverse function that reverses non-linearity of the second frequency response characteristic.

Example 13. The system of any of Examples 10-12, wherein: the first pre-processing function corresponds to a first cut function that segments the driving signal data according to a first frequency allocation for a first frequency range in which the first haptic actuator operates more efficiently than the second haptic actuator, and the second pre-processing function corresponds to a second cut function that segments the driving signal data according to a second frequency allocation for a second frequency range in which the second haptic actuator operates more efficiently than the first haptic actuator.

Example 14. The system of any of Examples 10-13, wherein the haptic device comprises at least one sensor that detects vibrations generated by the first haptic actuator and the second haptic actuator, the at least one physical processor being further configured to: determine, during a calibration procedure, output driving signal data based on sensed vibrations produced by the first haptic actuator and the second haptic actuator; compare, during the calibration procedure, the driving signal data to the output driving signal data; and adjust, during the calibration procedure, at least one of the first pre-processing function or the second pre-processing function based on the comparison.

Example 15. The system of any of Examples 10-14, wherein the at least one physical processor is further configured to determine, during the calibration procedure, the driving signal data to perform a frequency sweep.

Example 16. The system of any of Examples 10-15, wherein the at least one sensor corresponds to at least one of: an inertial measurement unit (IMU); a piezoelectric or piezoresistive sensor; an optical sensor; a pressure sensor; or a strain gauge.

Example 17. The system of any of Examples 10-16, wherein the at least one physical processor is further configured to: determine, during a calibration procedure, the driving signal data to perform a frequency sweep; drive the first haptic actuator and the second haptic actuator according to the driving signal data without preprocessing; generate measurements of vibrations produced by the haptic device; observe the first frequency response characteristic and the second frequency response characteristic based on the measurements; develop the first pre-processing function and the second pre-processing function respectively based on the first frequency response characteristic and the second frequency response characteristic; and store the first pre-processing function and the second pre-processing function in at least one memory of the at least one physical processor.

Example 18. A computer-readable medium may have computer-readable instructions recorded thereon that, when executed by one or more physical processors of a haptic device, cause the one or more physical processors to: determine driving signal data, wherein the haptic device comprises a first haptic actuator exhibiting a first frequency response characteristic, and a second haptic actuator exhibiting a second frequency response characteristic different from the first frequency response characteristic; generate a first driving signal by applying a first pre-processing function to the driving signal data; generate a second driving signal by applying a second pre-processing function to the driving signal data, wherein the second pre-processing function is different from the first pre-processing function and the second driving signal is different from the first driving signal; drive the first haptic actuator by supplying the first driving signal to the first haptic actuator; and drive the second haptic actuator by supplying the second driving signal to the second haptic actuator.

Example 19. The computer-readable medium of Example 8, wherein the first pre-processing function is a first inverse function that reverses nonlinearity of the first frequency response characteristic and the second pre-processing function is a second inverse function that reverses non-linearity of the second frequency response characteristic.

Example 20. The computer-readable medium of any of Examples 18 and 19, wherein: the first pre-processing function corresponds to a first cut function that segments the driving signal data according to a first frequency allocation for a first frequency range in which the first haptic actuator operates more efficiently than the second haptic actuator, and the second pre-processing function corresponds to a second cut function that segments the driving signal data according to a second frequency allocation for a second frequency range in which the second haptic actuator operates more efficiently than the first haptic actuator.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
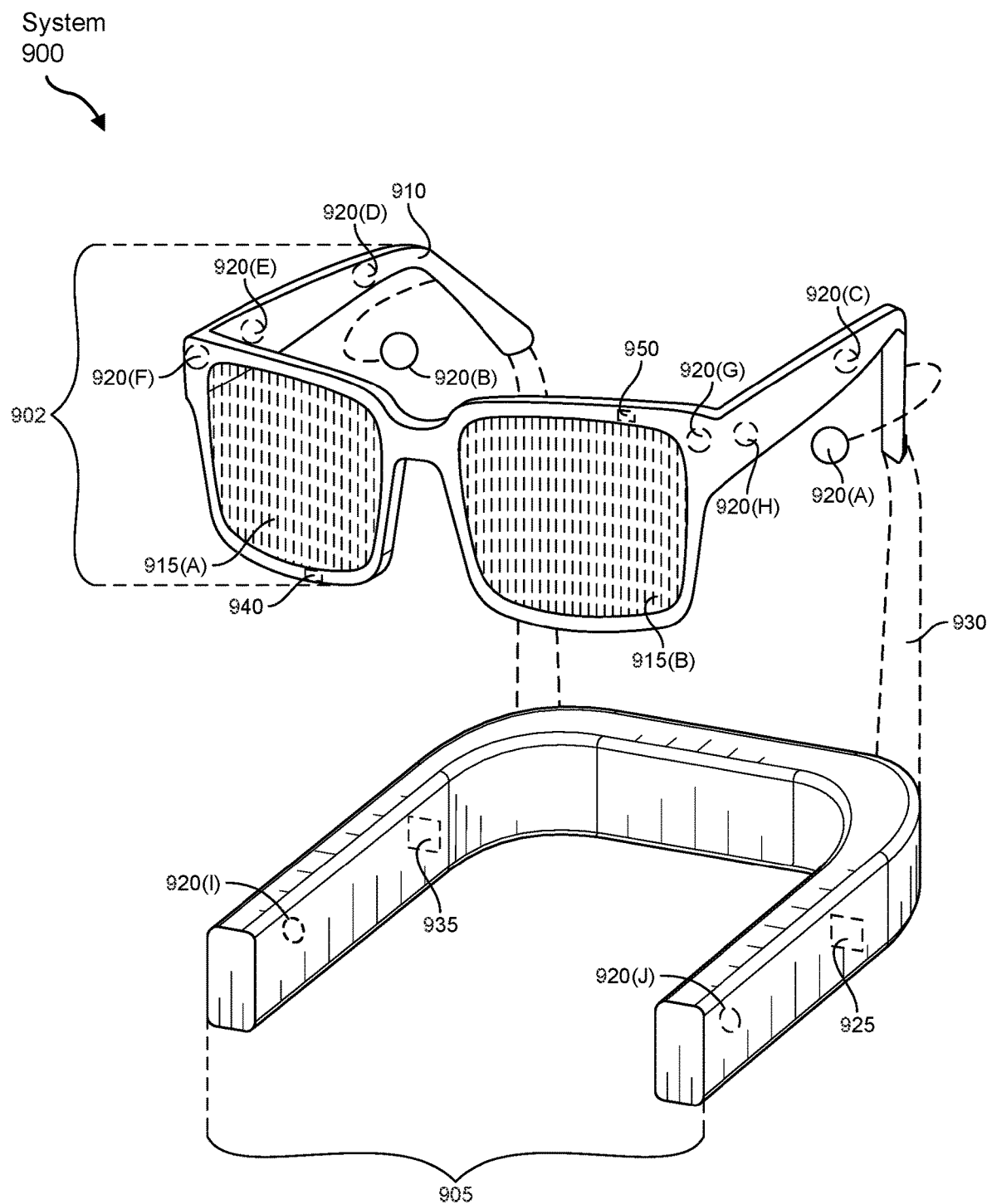
FIG. 9 is an illustration of exemplary augmented-reality glasses that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(1) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a Bluetooth connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 900 and 1000 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 11:
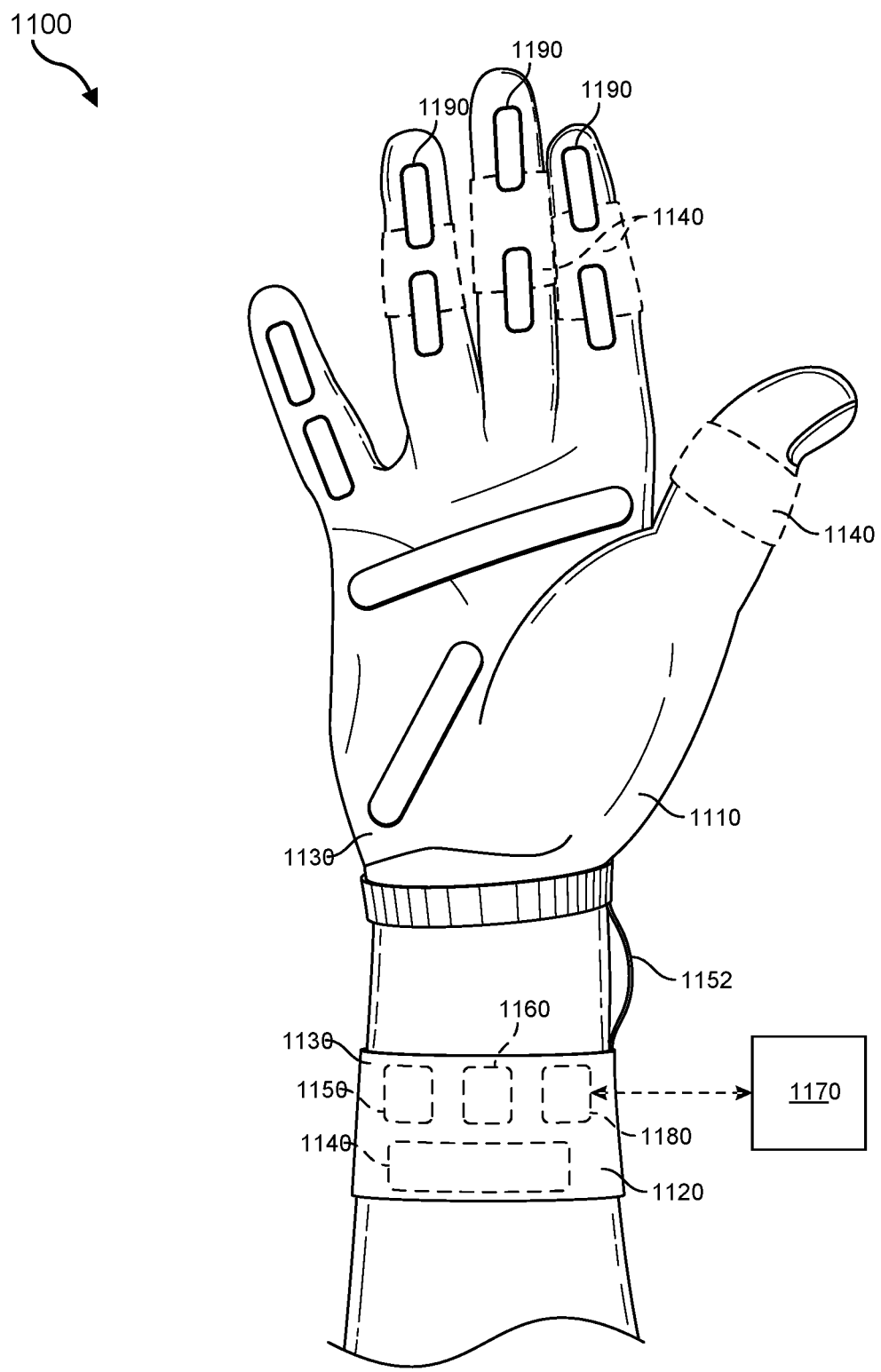
FIG. 11 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, Bluetooth, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Figure 12:
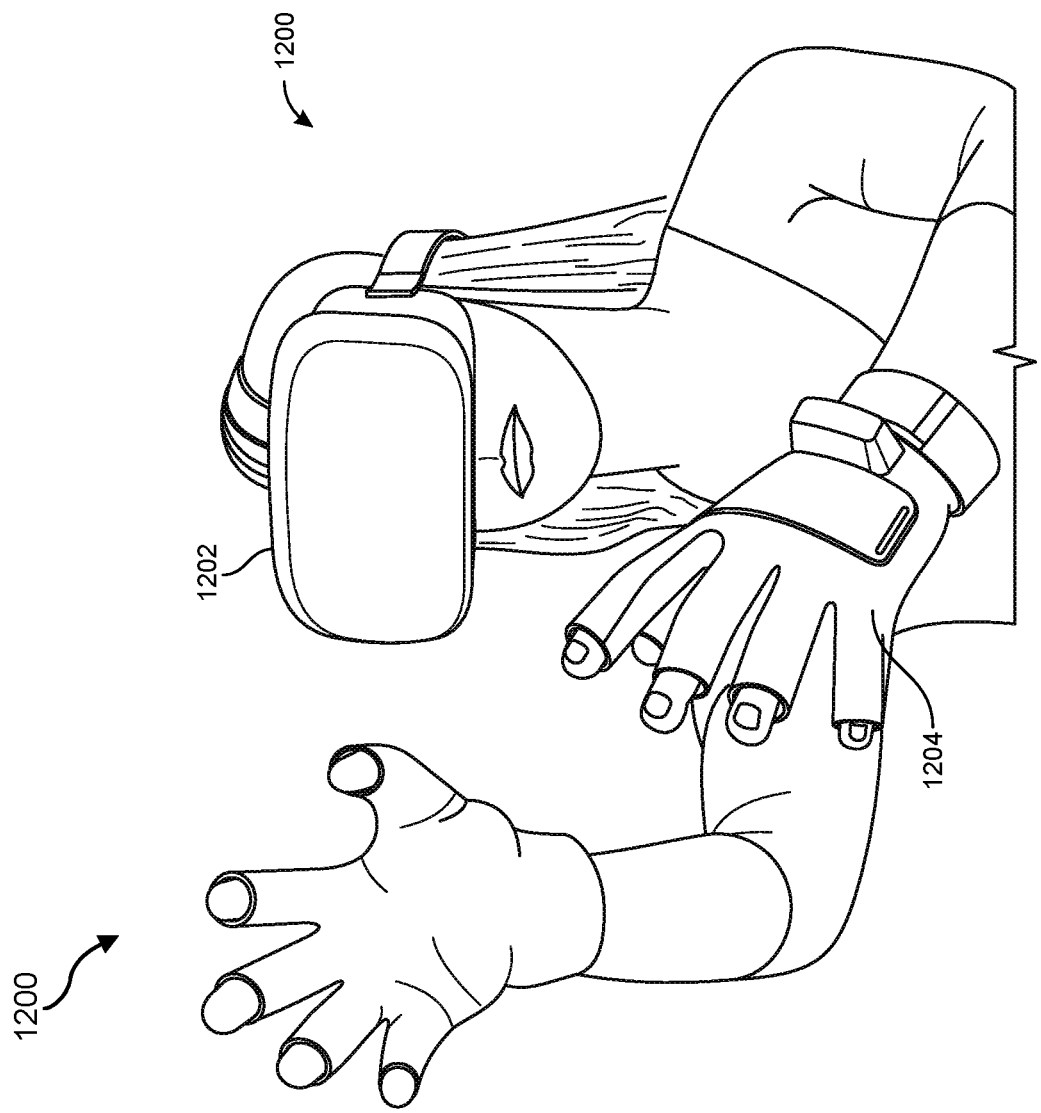
FIG. 12 is an illustration of an exemplary virtual-reality environment according to embodiments of this disclosure.

Haptic wearables, such as those shown in and described in connection with FIG. 11, may be implemented in a variety of types of artificial-reality systems and environments. FIG. 12 shows an example artificial-reality environment 1200 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 10:
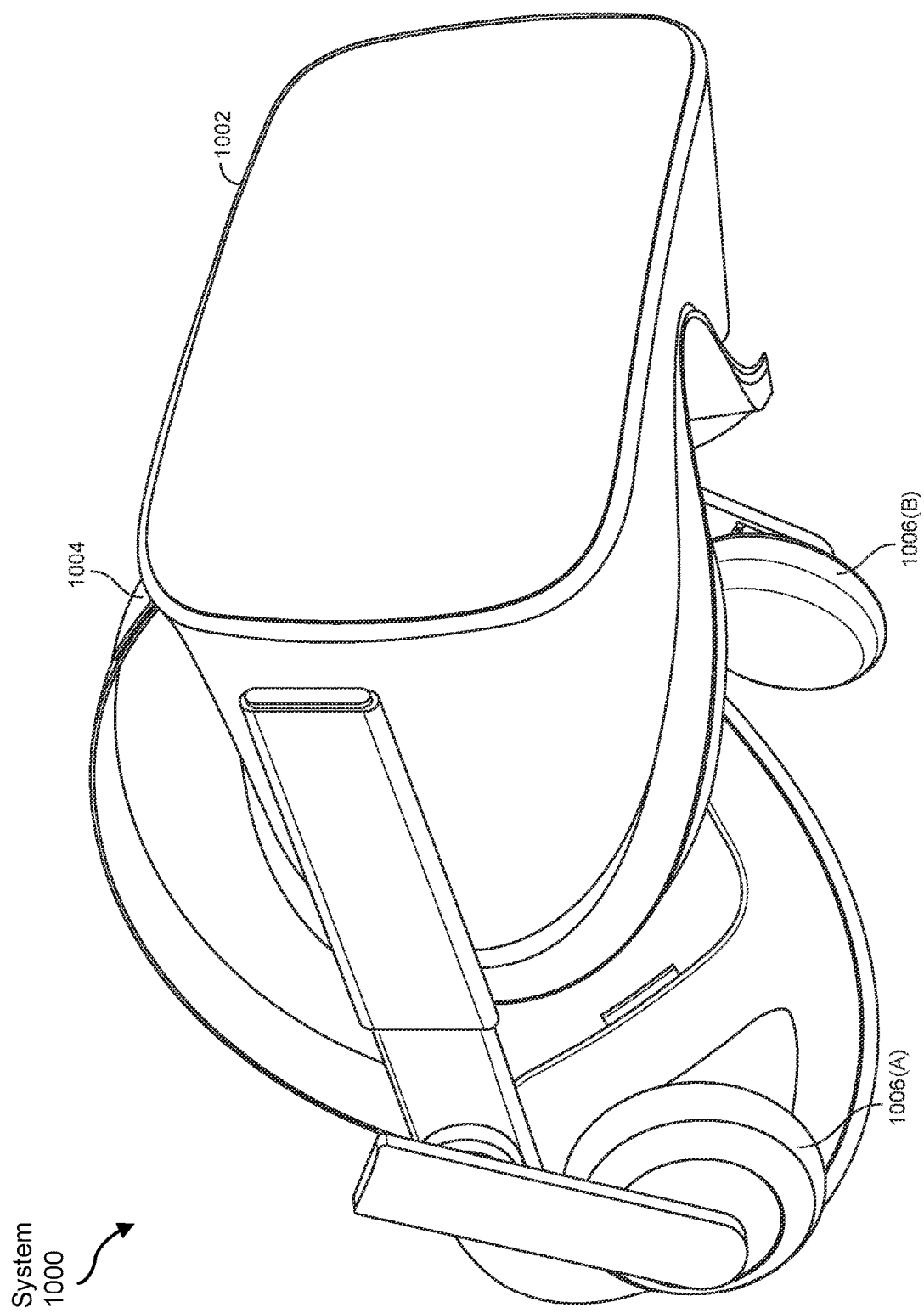
FIG. 10 is an illustration of an exemplary virtual-reality headset that may be used in connection with embodiments of this disclosure.

Head-mounted display 1202 generally represents any type or form of virtual-reality system, such as virtual-reality system 1000 in FIG. 10. Haptic device 1204 generally represents any type or form of wearable device, worn by a user of an artificial-reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

Figure 13:
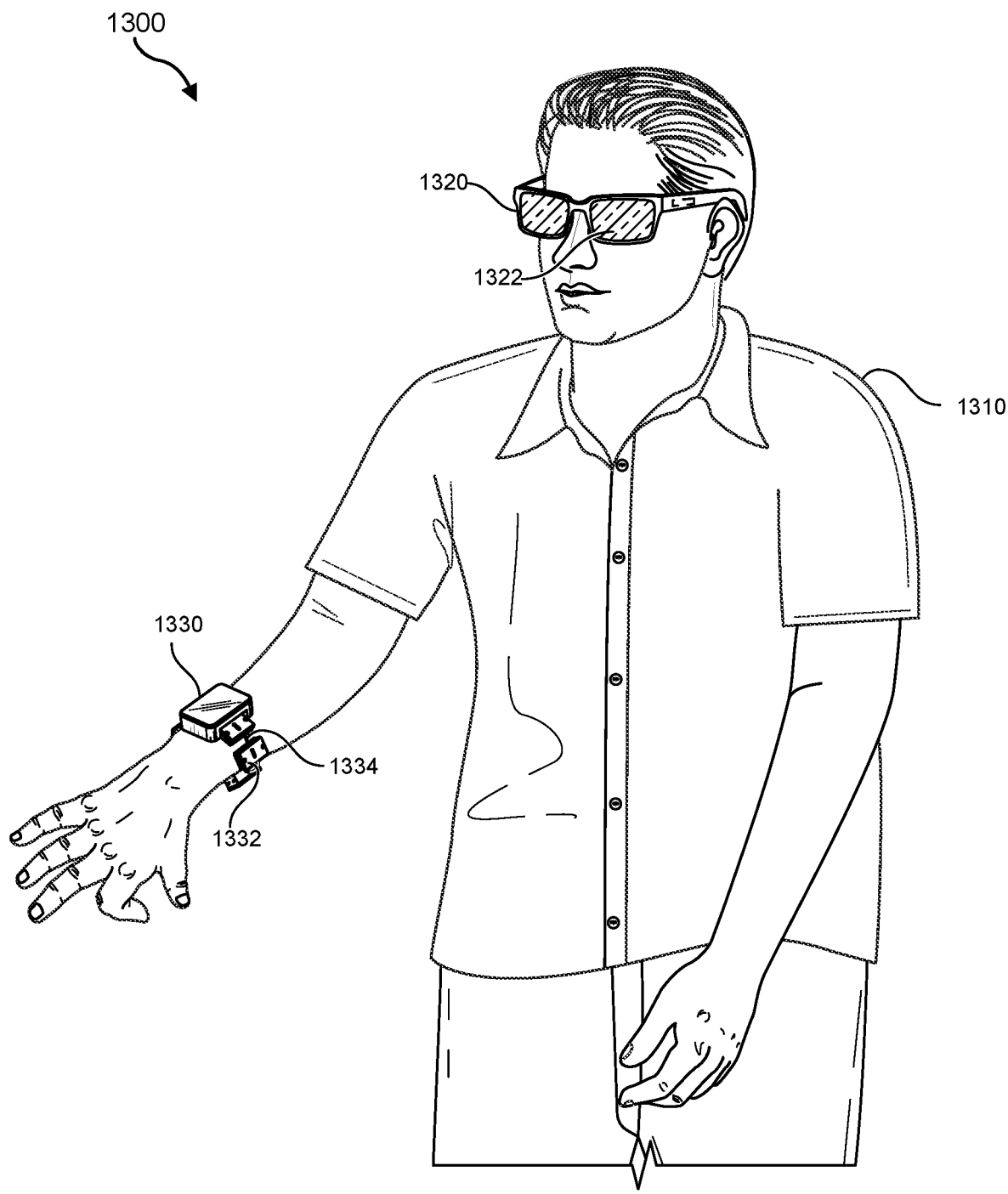
FIG. 13 is an illustration of an exemplary augmented-reality environment according to embodiments of this disclosure.

While haptic interfaces may be used with virtual-reality systems, as shown in FIG. 12, haptic interfaces may also be used with augmented-reality systems, as shown in FIG. 13. FIG. 13 is a perspective view of a user 1310 interacting with an augmented-reality system 1300. In this example, user 1310 may wear a pair of augmented-reality glasses 1320 that may have one or more displays 1322 and that are paired with a haptic device 1330. In this example, haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive haptic image data to be transformed, transform the haptic image data using stored pre-processing functions, output a result of the transformation to drive haptic actuators of a haptic device, measure a result of the transformation, and store the result of the transformation by adjusting the stored pre-processing functions based on the measured results. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

The invention claimed is:

1. A computer-implemented method, comprising:
  determining, by at least one physical processor of a haptic device, driving signal data, wherein the haptic device comprises a first haptic actuator exhibiting a first frequency response characteristic, and a second haptic actuator exhibiting a second frequency response characteristic different from the first frequency response characteristic;

generating, by the at least one physical processor, a first driving signal by applying a first pre-processing function to the driving signal data;

generating, by the at least one physical processor, a second driving signal by applying a second pre-processing function to the driving signal data, wherein the second pre-processing function is different from the first pre-processing function and the second driving signal is different from the first driving signal, the first pre-processing function corresponds to a first cut function that segments the driving signal data according to a first frequency allocation for a first frequency range, and the second pre-processing function corresponds to a second cut function that segments the driving signal data according to a second frequency allocation for a second frequency range;

driving, by the at least one physical processor, the first haptic actuator by supplying the first driving signal to the first haptic actuator; and driving, by the at least one physical processor, the second haptic actuator by supplying the second driving signal to the second haptic actuator.

2. The method of claim 1, wherein the haptic device comprises a third haptic actuator exhibiting a third frequency response characteristic different from the first frequency response characteristic and the second frequency response characteristic, the method further comprising:

generating, by the at least one physical processor, a third driving signal by applying a third pre-processing function to the driving signal data, wherein the third pre-processing function is different from the first pre-processing function and the second pre-processing function, and the third driving signal is different from the first driving signal and the second driving signal; and driving, by the at least one physical processor, the third haptic actuator by supplying the third driving signal to the third haptic actuator.

3. The method of claim 1, wherein the first haptic actuator operates more efficiently than the second haptic actuator in the first frequency range.

4. The method of claim 3, wherein the second haptic actuator operates more efficiently than the first haptic actuator in the second frequency range.

5. The method of claim 1, wherein the haptic device comprises at least one sensor that detects vibrations generated by the first haptic actuator and the second haptic actuator, the method further comprising:

determining, by the at least one physical processor during a calibration procedure, output driving signal data based on sensed vibrations produced by the first haptic actuator and the second haptic actuator;

comparing, by the at least one physical processor during the calibration procedure, the driving signal data to the output driving signal data; and adjusting, by the at least one physical processor during the calibration procedure, at least one of the first pre-processing function or the second pre-processing function based on the comparison.

6. The method of claim 5, further comprising:

determining, by the at least one physical processor during the calibration procedure, the driving signal data to perform a frequency sweep.

7. The method of claim 5, wherein the at least one sensor comprises at least one of:

an inertial measurement unit (IMU);
a piezoelectric or piezoresistive sensor;
an optical sensor;
a pressure sensor; or
a strain gauge.

8. The method of claim 1, further comprising:

determining, by at least one physical processor during a calibration procedure, the driving signal data to perform a frequency sweep;

driving, by at least one physical processor during the calibration procedure, the first haptic actuator and the second haptic actuator according to the driving signal data without preprocessing;

generating measurements of vibrations produced by the haptic device;

observing the first frequency response characteristic and the second frequency response characteristic based on the measurements;

developing the first pre-processing function and the second pre-processing function respectively based on the first frequency response characteristic and the second frequency response characteristic; and storing the first pre-processing function and the second pre-processing function in at least one memory of the at least one physical processor.

9. The method of claim 8, wherein the generating measurements of vibrations produced by the haptic device is performed using a laser vibrometer.

10. A system, comprising:

at least one physical processor of a haptic device; and at least one memory coupled to the at least one physical processor, wherein the at least one physical processor is configured to:

determine driving signal data, wherein the haptic device comprises a first haptic actuator exhibiting a first frequency response characteristic, and a second haptic actuator exhibiting a second frequency response characteristic different from the first frequency response characteristic;

generate a first driving signal by applying a first pre-processing function to the driving signal data;

generate a second driving signal by applying a second pre-processing function to the driving signal data, wherein the second pre-processing function is different from the first pre-processing function and the second driving signal is different from the first driving signal, the first pre-processing function corresponds to a first cut function that segments the driving signal data according to a first frequency allocation for a first frequency range, and the second pre-processing function corresponds to a second cut function that segments the driving signal data according to a second frequency allocation for a second frequency range;

drive the first haptic actuator by supplying the first driving signal to the first haptic actuator; and drive the second haptic actuator by supplying the second driving signal to the second haptic actuator.

11. The system of claim 10, wherein the haptic device comprises a third haptic actuator exhibiting a third frequency response characteristic different from the first frequency response characteristic and the second frequency response characteristic, the at least one physical processor being further configured to:

generate a third driving signal by applying a third pre-processing function to the driving signal data, wherein the third pre-processing function is different from the first pre-processing function and the second pre-processing function, and the third driving signal is different from the first driving signal and the second driving signal; and drive the third haptic actuator by supplying the third driving signal to the third haptic actuator.

12. The system of claim 10, wherein the first haptic actuator operates more efficiently than the second haptic actuator in the first frequency range.

13. The system of claim 12, wherein the second haptic actuator operates more efficiently than the first haptic actuator in the second frequency range.

14. The system of claim 10, wherein the haptic device comprises at least one sensor that detects vibrations generated by the first haptic actuator and the second haptic actuator, the at least one physical processor being further configured to:

determine, during a calibration procedure, output driving signal data based on sensed vibrations produced by the first haptic actuator and the second haptic actuator;

compare, during the calibration procedure, the driving signal data to the output driving signal data; and adjust, during the calibration procedure, at least one of the first pre-processing function or the second pre-processing function based on the comparison.

15. The system of claim 14, wherein the at least one physical processor is further configured to:

determine, during the calibration procedure, the driving signal data to perform a frequency sweep.

16. The system of claim 14, wherein the at least one sensor corresponds to at least one of:

an inertial measurement unit (IMU);
a piezoelectric or piezoresistive sensor;
an optical sensor;
a pressure sensor; or
a strain gauge.

17. The system of claim 10, wherein the at least one physical processor is further configured to:

determine, during a calibration procedure, the driving signal data to perform a frequency sweep;

drive the first haptic actuator and the second haptic actuator according to the driving signal data without preprocessing;

generate measurements of vibrations produced by the haptic device;

observe the first frequency response characteristic and the second frequency response characteristic based on the measurements;

develop the first pre-processing function and the second pre-processing function respectively based on the first frequency response characteristic and the second frequency response characteristic; and store the first pre-processing function and the second pre-processing function in at least one memory of the at least one physical processor.

18. A computer-readable medium having computer-readable instructions recorded thereon that, when executed by one or more physical processors of a haptic device, cause the one or more physical processors to: determine driving signal data, wherein the haptic device comprises a first haptic actuator exhibiting a first frequency response characteristic, and a second haptic actuator exhibiting a second frequency response characteristic different from the first frequency response characteristic;

generate a first driving signal by applying a first pre-processing function to the driving signal data;

generate a second driving signal by applying a second pre-processing function to the driving signal data, wherein the second pre-processing function is different from the first pre-processing function and the second driving signal is different from the first driving signal, the first pre-processing function corresponds to a first cut function that segments the driving signal data according to a first frequency allocation for a first frequency range, and the second pre-processing function corresponds to a second cut function that segments the driving signal data according to a second frequency allocation for a second frequency range;

drive the first haptic actuator by supplying the first driving signal to the first haptic actuator; and drive the second haptic actuator by supplying the second driving signal to the second haptic actuator.

19. The computer-readable medium of claim 18, wherein the first haptic actuator operates more efficiently than the second haptic actuator in the first frequency range.

20. The computer-readable medium of claim 19, wherein the second haptic actuator operates more efficiently than the first haptic actuator in the second frequency range.

* * * * *